(12) United States Patent
Chen (10) Patent No.: US 11,347,300 B2
(45) Date of Patent: May 31, 2022

(54) CENTRAL PROCESSING UNIT VOLTAGE RAIL THAT IS INDEPENDENT OF POWER STATE COMMANDS

(71) Applicant: MONOLITHIC POWER SYSTEMS, INC., San Jose, CA (US)

(72) Inventor: I-Fan Chen, Taipei (TW)

(73) Assignee: Monolithic Power Systems, Inc., San Jose, CA (US)

(*) Notice: Subject to any disclaimer, the term of this patent is extended or adjusted under 35 U.S.C. 154(b) by 203 days.

(21) Appl. No.: 16/918,744

(22) Filed: Jul. 1, 2020

(65) Prior Publication Data

US 2022/0004248 A1 Jan. 6, 2022

(51) Int. Cl.
| | |
|---|---|
| *G06F 1/3296* | (2019.01) |
| *H02M 3/158* | (2006.01) |
| *G06F 1/28* | (2006.01) |
| *G06F 1/3287* | (2019.01) |

(52) U.S. Cl.
CPC .............. *G06F 1/3296* (2013.01); *G06F 1/28* (2013.01); *G06F 1/3287* (2013.01); *H02M 3/158* (2013.01)

(58) Field of Classification Search
None
See application file for complete search history.

(56) References Cited

U.S. PATENT DOCUMENTS 8,638,161 B2 * 1/2014 Robertson ............... G06F 1/26
327/540
2014/0189225 A1 * 7/2014 Conrad ................ G06F 1/3243
711/105
2018/0203623 A1 * 7/2018 Imamura ............ G06F 11/2082

OTHER PUBLICATIONS

Electronics360—Multiphase PWM Controllers Office Adaptive Voltage Scaling Interface, Nov. 16, 2016, 2 pages, retrieved from the internet: https://electronics360.globalspec.com/article/7691/mutiphase-pwm-controllers-offer-adaptive-voltage-scaling-interface.
Dual-Loop, Digital, Multi-Phase Controller with PMBus Interface, Dec. 14, 2019, 4 pages, retrieved from the internet: https://eepower.com/new-industry-products/dual-loop-digital-multi-phase-controller-with-pmbus-interface/.
MPS—MP2853 Dual-Loop, Digital, Multi-Phase Controller with PMBus Interface for AMD SV12, Nov. 16, 2018, 124 pages.
MPS—MP2965 Dual-Loop, Digital, Multi-Phase Controller with PMBus Interface for VR13.HC/AVSBUS, Apr. 10, 2019, 160 pages.
MPS—MP86933 16V, Intelli-Phase Solution in a TQFN 3x3 Package, May 25, 2020, 14 pages.
MPS—MP86934 16V, Intelli-Phase Solution in a TQFN 3x4, May 21, 2020, 15 pages.

* cited by examiner

*Primary Examiner* — Paul Yen
(74) *Attorney, Agent, or Firm* — Patrick D. Benedicto (57) ABSTRACT

Voltage regulators generate voltage rails that power a central processing unit (CPU). The CPU communicates power management instructions to a power supply controller that drives the voltage regulators. The power supply controller sets a voltage level of a voltage rail generated by a voltage regulator in accordance with a power management instruction received from the CPU. The power supply controller enables the voltage regulator to operate in discontinuous conduction mode (DCM) independent of power state commands from the CPU.

20 Claims, 11 Drawing Sheets

CENTRAL PROCESSING UNIT VOLTAGE RAIL THAT IS INDEPENDENT OF POWER STATE COMMANDS

BACKGROUND OF THE INVENTION

1. Field of the Invention

The present invention relates generally to electrical circuits, and more particularly but not exclusively to voltage rails that power a central processing unit.

2. Description of the Background Art

A Central Processing Unit (CPU), also referred to as a "processor", receives power from a power supply that provides two or more voltage rails. Some processors, such as those available from Advanced Micro Devices, Inc. (AMD), control the operation of the power supply that generates the voltage rails by sending power management instructions over a serial or parallel voltage control bus. The power management instructions command the power supply to adjust individual voltage rails, to operate individual voltage rails in accordance with a power state, etc. A power state may indicate operating a voltage regulator in full-phase continuous conduction mode (CCM), single-phase CCM, or discontinuous conduction mode (DCM). This allows the processor, instead of the power supply, to make the decisions regarding power delivery to the processor.

SUMMARY

Voltage regulators generate voltage rails that power a central processing unit (CPU). The CPU communicates power management instructions to a power supply controller that drives the voltage regulators. The power supply controller sets a voltage level of a voltage rail generated by a voltage regulator in accordance with a power management instruction received from the CPU. The power supply controller enables the voltage regulator to operate in discontinuous conduction mode (DCM) independent of power state commands from the CPU.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
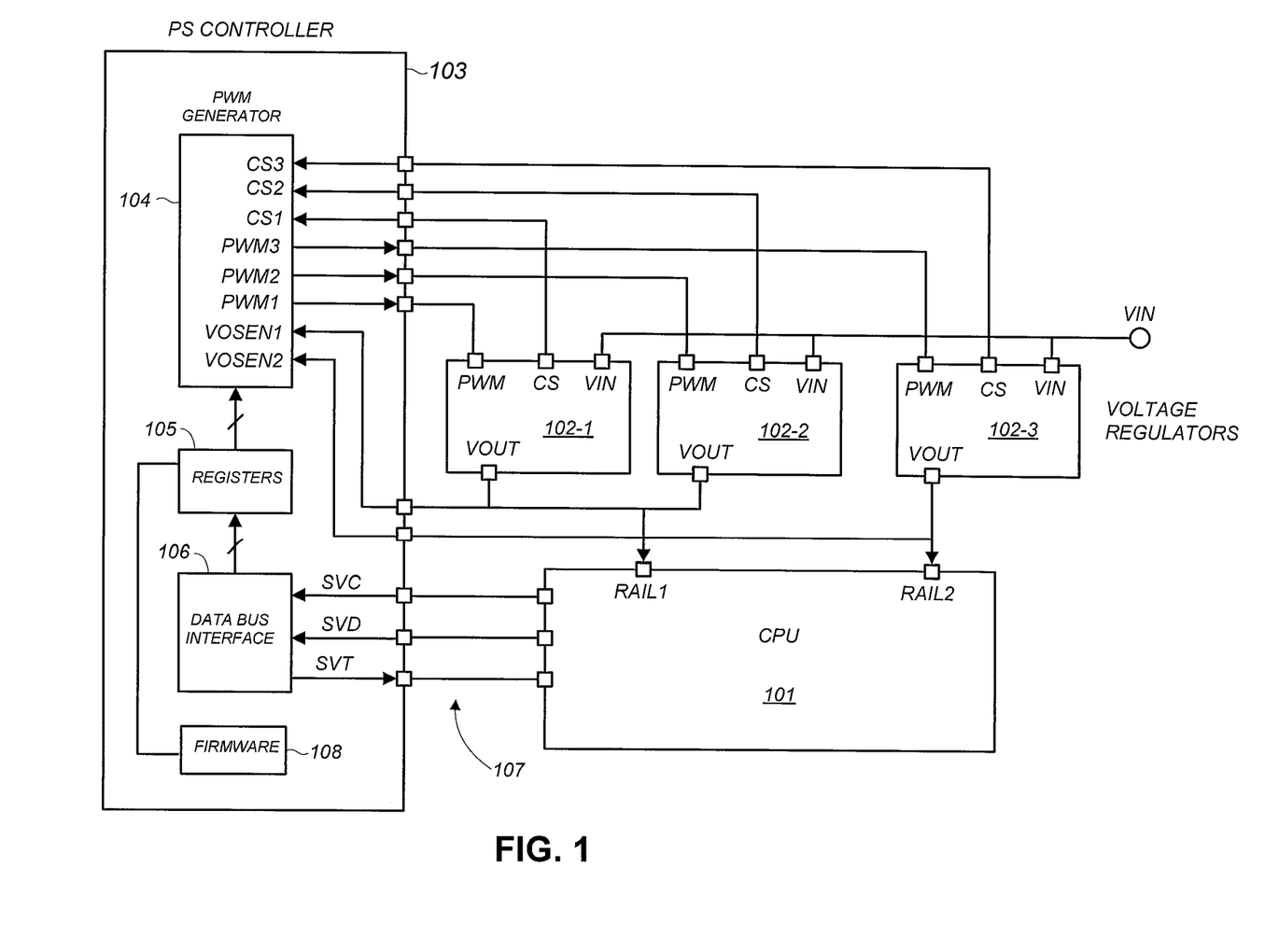
FIG. 1 shows a schematic diagram of a computing device in accordance with an embodiment of the present invention.

FIG. 1 shows a schematic diagram of a computing device in accordance with an embodiment of the present invention. The computing device may be a laptop computer, a desktop computer, a server computer, or other computing device. Other components of the computing device that are not necessary to the understanding of the invention, such as memory, input/output devices, storage devices, etc., are not shown for clarity of illustration.

In the example of FIG. 1, the computing device includes a processor 101 and a power supply that comprises a power supply controller 103 and a plurality of voltage regulators 102 (102-1, 102-2, and 102-3). In one embodiment, the power supply controller 103 and the plurality of voltage regulators 102 are individual, separate integrated circuits.

In one embodiment, the processor 101 is the AMD RYZEN™ processor and a voltage regulator 102 is implemented using an Intelli-Phase™ voltage regulator available from Monolithic Power Systems, Inc. of San Jose, Calif. Embodiments of the present invention may be implemented, with suitable modifications to add functionality explained below, using commercially-available power supply controllers, such as the MP2945 controller available from Monolithic Power System, Inc. As can be appreciated, embodiments of the present invention are equally applicable to other processors, voltage regulators, and power supply controllers.

In the example of FIG. 1, the processor 101 is powered by a first voltage rail RAIL1 and a second voltage rail RAIL2. In one embodiment, the voltage regulators 102-1 and 102-2 are configured as a multiphase voltage generator that generates the voltage rail RAIL1 up to 1.55V and 50 A. The voltage regulator 102-1 may generate a first phase of the voltage rail RAIL1 and the voltage regulator 102-2 may generate a second phase of the voltage rail RAIL1. In one embodiment, the voltage regulator 102-3 is configured as a single-phase voltage generator that generates the second voltage rail RAIL2 up to 1.55V and 17 A. The voltage rail RAIL1, being a multiphase voltage rail, is also referred to as the "high-current rail", whereas the voltage rail RAIL2 is also referred to as the "low-current-rail."

The processor 101 transmits power management instructions to the power supply controller 103 over a serial data bus 107, which in the example of FIG. 1 comprises a line for transmitting a data signal SVD and a line for transmitting a clock signal SVC. The serial data bus 107 further includes a line for providing the processor 101 a telemetry signal SVT. In one embodiment, the data bus 107 conforms to the AMD SVI 2.0 serial bus specification. As can be appreciated, embodiments of the present invention are equally applicable to other data buses, including parallel voltage identification data buses.

The processor 101 may set the voltage level of individual voltage rails by sending corresponding power management instructions to the power supply controller 103. The processor 101 may also send power management instructions to set the power state of a voltage regulator. For example, the processor 101 may set the power state of the multiphase voltage regulator formed by the voltage regulators 102-1 and 102-2. As will be more apparent below, to save power during light load conditions (i.e., at low load currents), the voltage regulator 102-3 operates in discontinuous conduction mode (DCM) independent of power state commands from the processor 101.

In the example of FIG. 1, the power supply controller 103 includes a pulse width modulation (PWM) generator 104, a plurality of data registers 105, and a serial data bus interface 106. The serial data bus interface 106 receives and processes the data signal SVD, in conjunction with the clock signal SVD, to detect one or more power management instructions transmitted by the processor 101. The serial data bus interface 106 sets the data registers 105 and performs other operations in accordance with a power management instruction received from the processor 101. The serial data bus interface 106 may also gather power supply telemetry data, such operating temperature, fault conditions, etc., and transmit the telemetry data to the processor 101 as the telemetry data SVT over the serial data bus 107. In one embodiment, features of the power supply controller 103 are programmable in a firmware 108, which comprises program code stored in non-volatile memory.

In the example of FIG. 1, a voltage regulator 102 includes a pin for receiving a PWM signal from the PWM generator 104, a pin for receiving an input voltage VIN from an external voltage source, a pin for outputting a current sense signal CS to the PWM generator 104, and a pin for outputting an output voltage VOUT to the processor 101. The PWM generator 104 senses the output voltage VOUT of the voltage regulator 102 on a corresponding pin for receiving a voltage sense signal VOSEN. A current sense signal CS indicates the inductor current of the voltage regulator 102, which is sensed by the PWM generator 104.

In the example of FIG. 1, the PWM generator 104 senses the output voltage VOUT of the voltage regulators 102-1 and 102-2 (i.e., voltage rail RAIL1) as a voltage sense signal VOSEN1 and senses the output voltage of the voltage regulator 102-3 (i.e., voltage rail RAIL2) as a voltage sense signal VOSEN2.

In the example of FIG. 1, the PWM generator 104 senses the inductor current of the voltage regulator 102-1 as a current sense signal CS1, the inductor current of the voltage regulator 102-2 as a current sense signal CS2, and the inductor current of the voltage regulator 102-3 as a current sense signal CS3. The load current drawn by the processor 101 from a voltage rail may be detected as an average of the sum of the inductor currents of the voltage regulators 102 that generate the voltage rail. In the example of FIG. 1, the load current drawn by the processor 101 from the first voltage rail RAIL1 may be detected by the PWM generator 104 as the average of the sum of the current sense signal CS1 and the current sense signal C2. The summation may be performed by a summation circuit (not shown), and the resulting sum may be averaged by the power supply controller 103.

In one embodiment, the PWM generator 104 is configured to generate a PWM signal to control the operation of a voltage regulator 102 by pulse width modulation. In the example of FIG. 1, the PWM generator 104 generates a PWM signal PWM1 for driving the voltage regulator 102-1, a PWM signal PWM2 for driving the voltage regulator 102-2, and a PWM signal PWM3 for driving the voltage regulator 102-3. The PWM generator 104 senses the output voltage VOUT and current sense signal CS of a voltage regulator 102 to generate a corresponding PWM signal for the voltage regulator 102.

The voltage level of the voltage rail RAIL1 or voltage RAIL2 may be set by the processor 101 by sending a corresponding power management instruction over the serial data bus 107. The commanded voltage level may be received by the data bus interface 106 and stored in one of the registers 105. The PWM generator 104 reads the commanded voltage level from the register 105 and generates a corresponding PWM signal so that the corresponding voltage regulator 102 generates an output voltage VOUT at the commanded voltage level.

Figure 2:
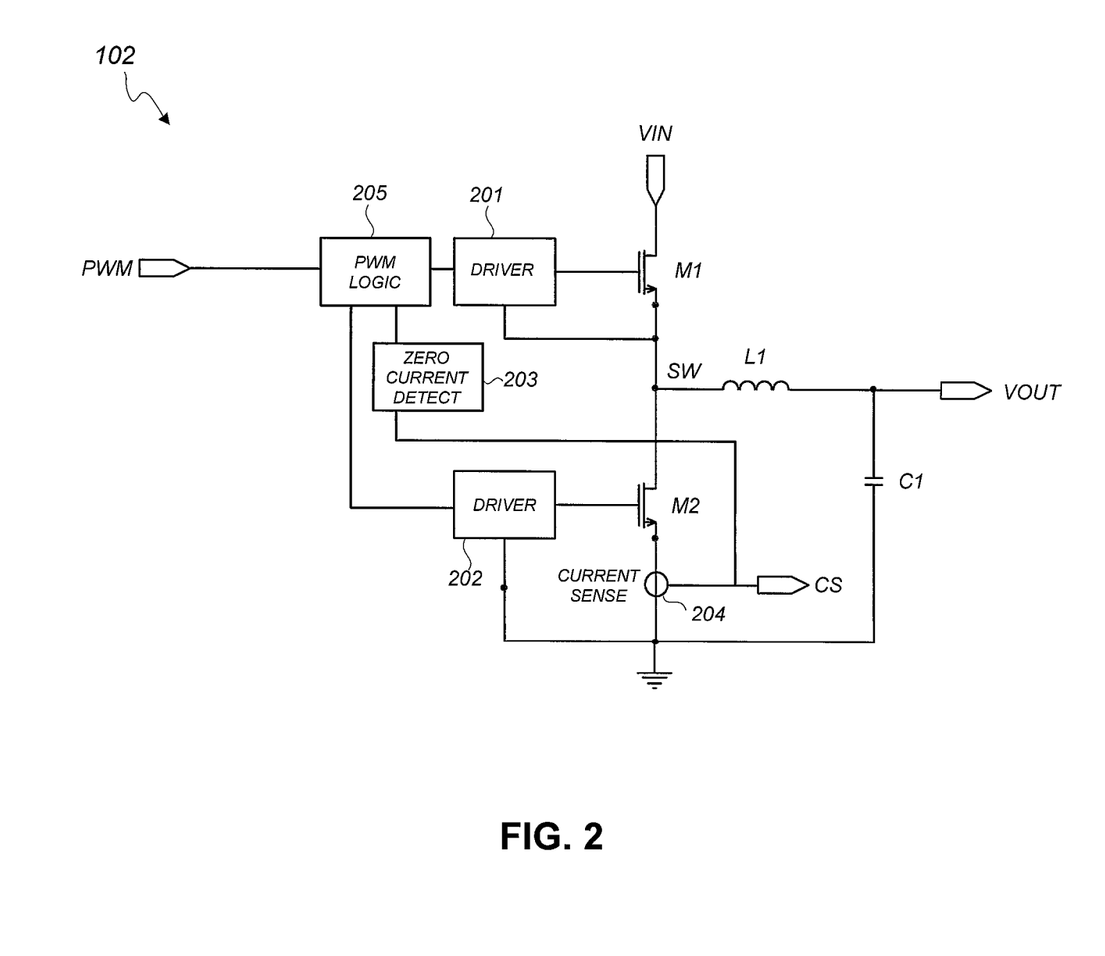
FIG. 2 shows a schematic diagram of a voltage regulator in accordance with an embodiment of the present invention.

FIG. 2 shows a schematic diagram of a voltage regulator 102 in accordance with an embodiment of the present invention. In the example of FIG. 2, the voltage regulator 102 comprises a high-side transistor M1 and a low-side transistor M2. When the transistor M1 is ON and the transistor M2 is OFF, the input voltage VIN is coupled to the load and current flows through the transistor M1 and an output inductor L1. When the transistor M1 is OFF and the transistor M2 is ON, current flows through the transistor M2 and the output inductor L1. The current of the output inductor L1, also referred to as inductor current, charges an output capacitor C1 to generate the output voltage VOUT. A current sense circuit 204 senses the inductor current to generate a corresponding current sense signal CS. The output inductor L1 and output capacitor C1 may be discrete components that are external to an integrated circuit package that includes the other components of the voltage regulator 102.

The PWM signal generated by the PWM generator 104 (see FIG. 1) is received by a PWM logic circuit 205, which drives the transistors M1 and M2 by way of driver circuits 201 and 202, respectively, in accordance with the PWM signal. The PWM generator 104 adjusts the frequency of the PWM signal to maintain the level of the output voltage VOUT during load transient. When the load current increases, the PWM generator 104 increases the frequency of the PWM signal to maintain the output voltage VOUT at a commanded voltage level. Similarly, the PWM generator 104 decreases the frequency of the PWM signal when the load current decreases.

In the example of FIG. 2, the voltage regulator 102 further includes a zero current detector 203 for detecting when the inductor current goes to zero. In one embodiment, the PWM logic 205 is configured to turn OFF the transistor M2 when the PWM signal is at tri-state (i.e., high impedance) and the inductor current becomes zero. This prevents negative inductor current when the PWM signal is at tri-state.

Figure 3:
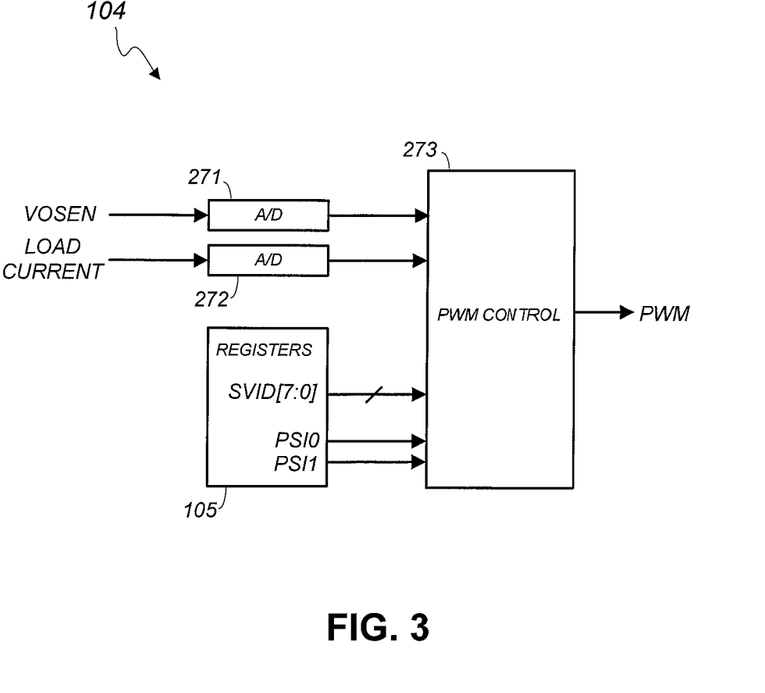
FIG. 3 shows a schematic diagram of a pulse width modulation (PWM) generator in accordance with an embodiment of the present invention.

FIG. 3 shows a schematic diagram of the PWM generator 104 in accordance with an embodiment of the present invention. FIG. 3 shows the circuits of the PWM generator 104 for generating a single PWM signal that drives a corresponding voltage regulator 102 (see FIG. 1). The circuits for generating the other PWM signals are similar and accordingly not shown for clarity of illustration.

In the example of FIG. 3, the output voltage VOUT of the voltage regulator 102 is received by the PWM generator 104 as the output voltage sense signal VOSEN. An analog-to-digital converter 271 converts the output voltage sense signal VOSEN to digital for input to a PWM control circuit 273. Similarly, an analog-to-digital converter 272 converts the load current to digital for input to the PWM control circuit 273. The load current is the average of the sum of the current sense signals CS1 and CS2 in the case of the voltage regulators 102-1 and 102-2, and is the average of the current sense signal CS3 in the case of the voltage regulator 102-3.

In the example of FIG. 3, power management instructions received from the processor 101 are stored in registers 105. Power management instruction may indicate the voltage level, power state, etc. commanded by the processor 101 for an individual voltage rail. A register 105 may store the voltage level commanded by the processor 101, which in the example of FIG. 3 is an 8-bit value ("SVID[7:0]"). The PWM control circuit 273 modulates the PWM signal such that the voltage regulator 102 maintains the voltage rail at the commanded voltage level at varying load currents.

A register 105 may also store a power state command from the processor 101.

In the example of FIG. 3, the power state indicator bits PSI0 and PSI1 are in accordance with the AMD SVI 2.0 specification and indicate the power state commanded by the processor 101 as follows:

PSI0=0 and PSI1=0: Full-phase CCM;
PSI0=1 and PSI1=0: Single-phase CCM;
PSI0=1 and PSI1=1: Single-phase DCM.

More particularly, a voltage regulator is to operate in full-phase CCM when both PSI0 and PSI1 are not asserted ("0"), the voltage regulator is to operate in single-phase DCM when both PSI0 and PSI1 are asserted ("1"), and the voltage regulator is to operate in single-phase CCM when PSI0 is asserted and PSI1 is not asserted.

In one embodiment, the power supply controller 103 operates the voltage regulators 102-1 and 102-2 to generate the voltage rail RAIL1 in accordance with the the power state commanded by the processor 101. That is, the power supply controller 103 operates the voltage regulators 102-1 and 102-2 in full-phase CCM when both PS10 and PSI are not asserted, in single-phase DCM when both PSI0 and PSI1 are asserted, and in single-phase CCM when PSI0 is asserted and PSI1 is not asserted.

In one embodiment, the power supply controller 103 operates the voltage regulator 102-3, to generate the voltage rail RAIL2, independent of the power state commanded by the processor 101. That is, the power supply controller 103 ignores power state commands for the voltage rail RAIL2. The power supply controller 103 enables the voltage regulator 102-3 to operate in DCM even when the processor 101 sets the power state bits for the voltage rail RAIL2 for CCM operation. The power supply controller 103 otherwise follows all other power management instructions for the voltage rail RAIL2, including power management instructions to change the voltage level of the voltage rail RAIL2. In one embodiment, this behavior of the power supply controller 103 with regards to the voltage regulator 102-3 is programmable in the firmware 108.

Figure 4:
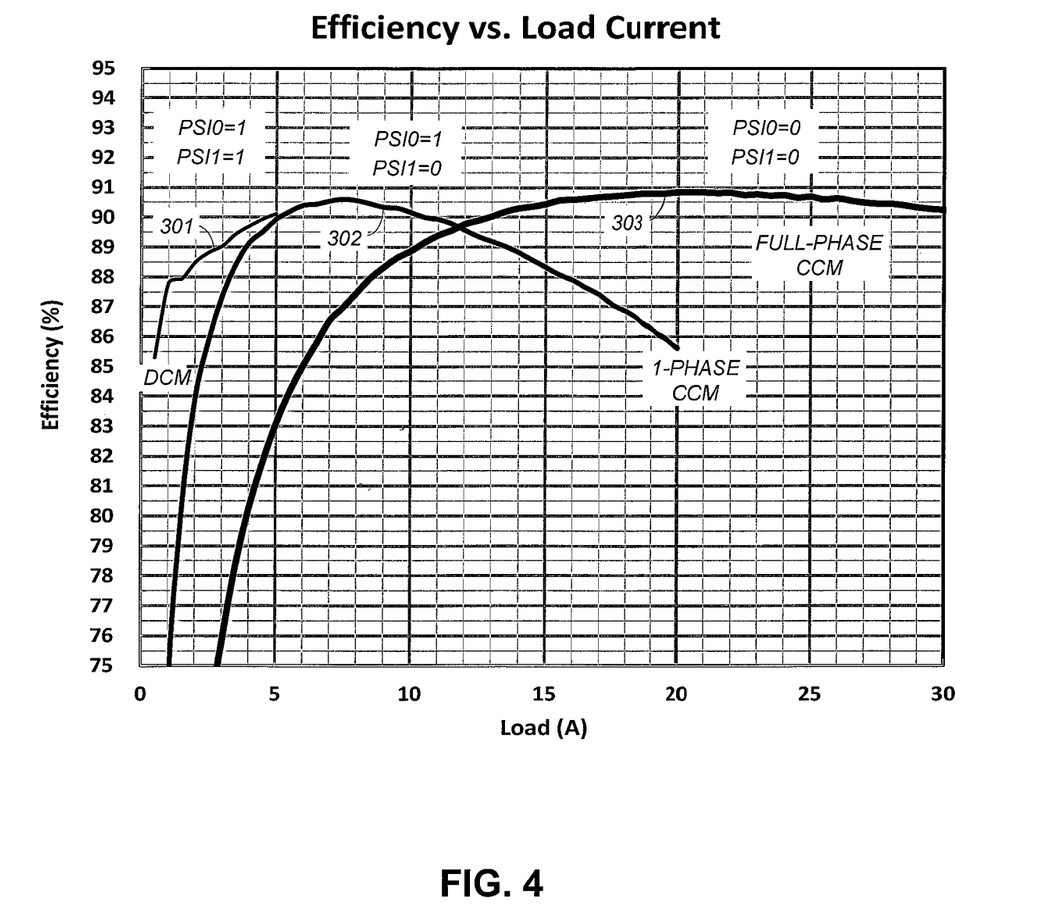
FIGS. 4 and 5 show curves of voltage regulator efficiency versus load current for different power states.

FIG. 4 shows curves of voltage regulator efficiency versus load current for different power states. In the example of FIG. 4, the vertical axis indicates efficiency in percent and the horizontal axis indicates load current in Amp. In one embodiment, the voltage regulators 102-1 and 102-2 are configured as a multiphase voltage regulator, which can operate in full-phase CCM (2-phase in this case), single-phase CCM, or single-phase DCM. On the other hand, the voltage regulator 102-3 is a single-phase voltage regulator that can operate in single-phase CCM or single-phase DCM.

In the example of FIG. 4, the curve 301 is for a voltage regulator operating in single-phase DCM, the curve 302 is for the voltage regulator operating in single-phase CCM, and the curve 303 is for the voltage regulator operating in full-phase CCM. As shown in FIG. 4, a voltage regulator preferably operates in full-phase CCM at high load currents, in single-phase CCM at medium load currents, and in single-phase DCM at low load currents. The processor 101 sets the power state indicators (PSI0 and PSI1) to place the voltage regulator in a power state that the processor 101 deems optimum for its present load requirement.

Figure 5:
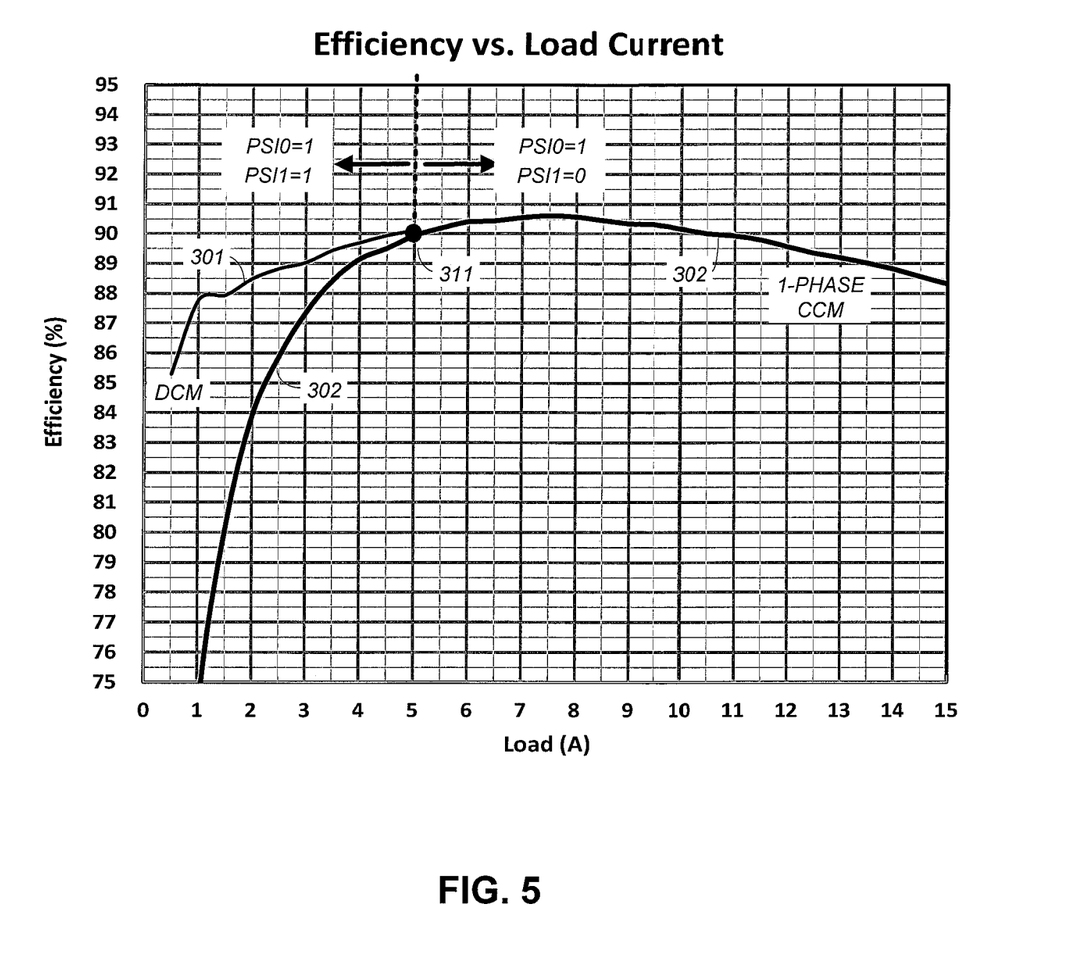

FIG. 5 shows curves of voltage regulator efficiency versus load current for different power states. In the example of FIG. 5, the vertical axis indicates efficiency in percent and the horizontal axis indicates load current in Amp. The curve 301 is for a voltage regulator operating in single-phase DCM and the curve 302 is for the voltage regulator operating in single-phase CCM. In the example of FIG. 5, the processor 101 should transition the voltage regulator from single-phase CCM to single-phase DCM when the load current decreases at a cross point 311 of the curves 301 and 302. In the example of FIG. 5, the processor 101 can do so by asserting the power state bits PSI0 and PSI1.

Figure 6:
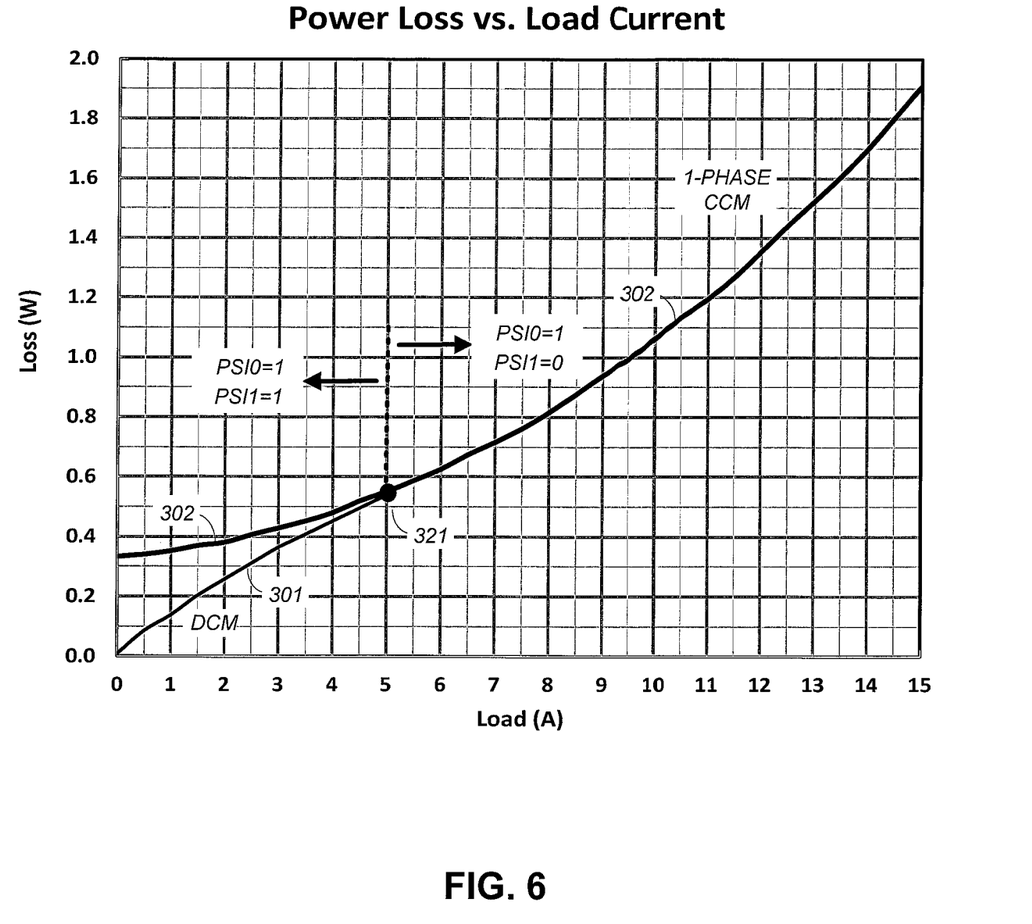
FIG. 6 shows curves of voltage regulator power loss versus load current for different power states.
Figure 7:
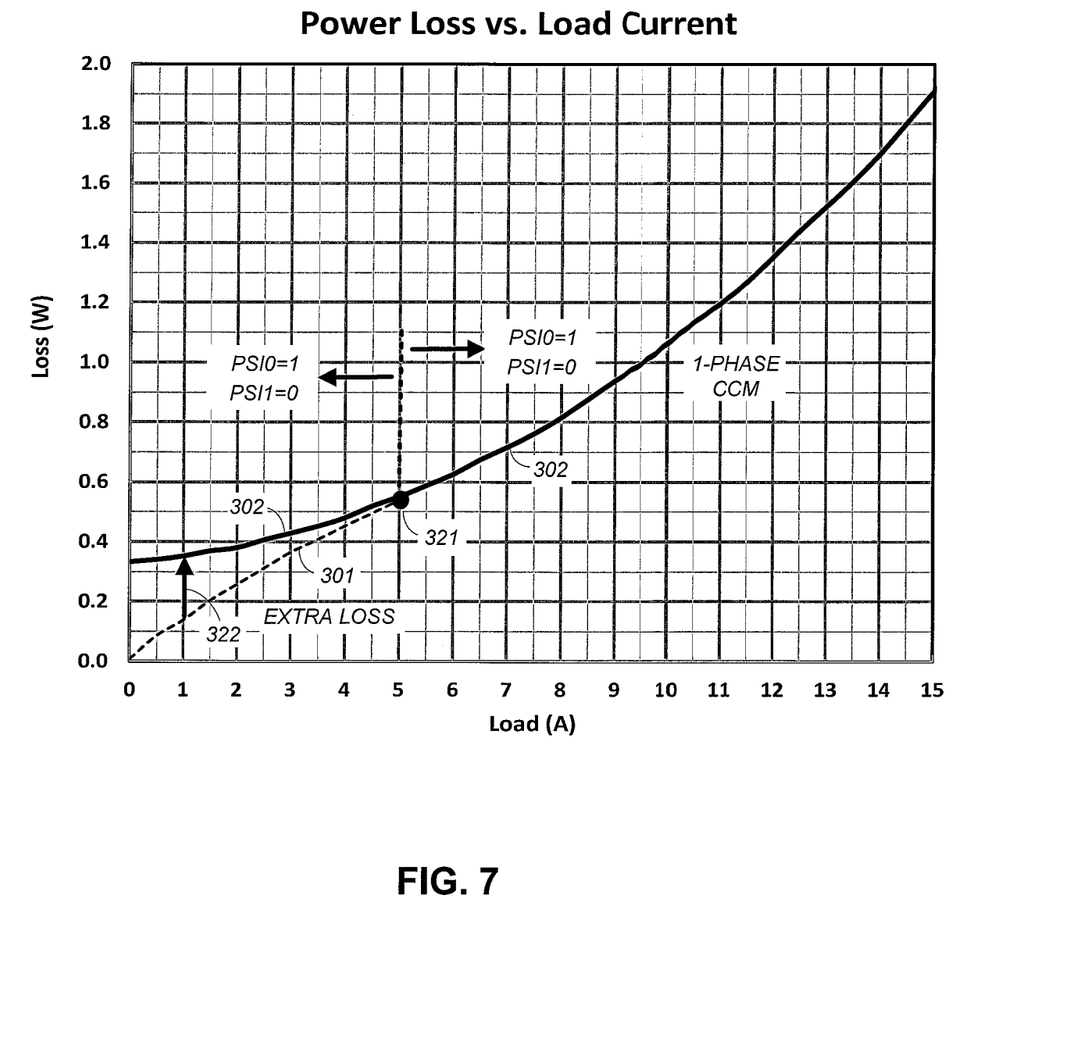
FIG. 7 shows curves of voltage regulator power loss versus load current for a voltage regulator operating in single-phase continuous conduction mode (CCM) instead of discontinuous conduction mode (DCM).

FIGS. 6 and 7 show curves of voltage regulator power loss versus load current, with the vertical axis indicating power loss in Watt and the horizontal axis indicating load current in Amp. The curve 301 is for a voltage regulator operating in single-phase DCM and the curve 302 is for the voltage regulator operating in single-phase CCM.

Referring to FIG. 6, the processor 101 should assert both power state bits PSI0 and PSI so that the voltage regulator operates in single-phase DCM at low load currents, which in the example of FIG. 6 is to the left of the cross point 321. However, as shown in FIG. 7, the inventor discovered that there may be situations where the processor 101 will not assert the power state bit PSI1 even at low load currents. In the example of FIG. 7, because the power state indicators from the processor 101 indicate a power state for single-phase CCM (i.e., PSI0=1, PSI1=0) at low load currents (to the left of the cross point 321), the voltage regulator operates in single-phase CCM and consequently incurs additional power loss (see arrow 322) compared to operating in single-phase DCM.

Figure 8:
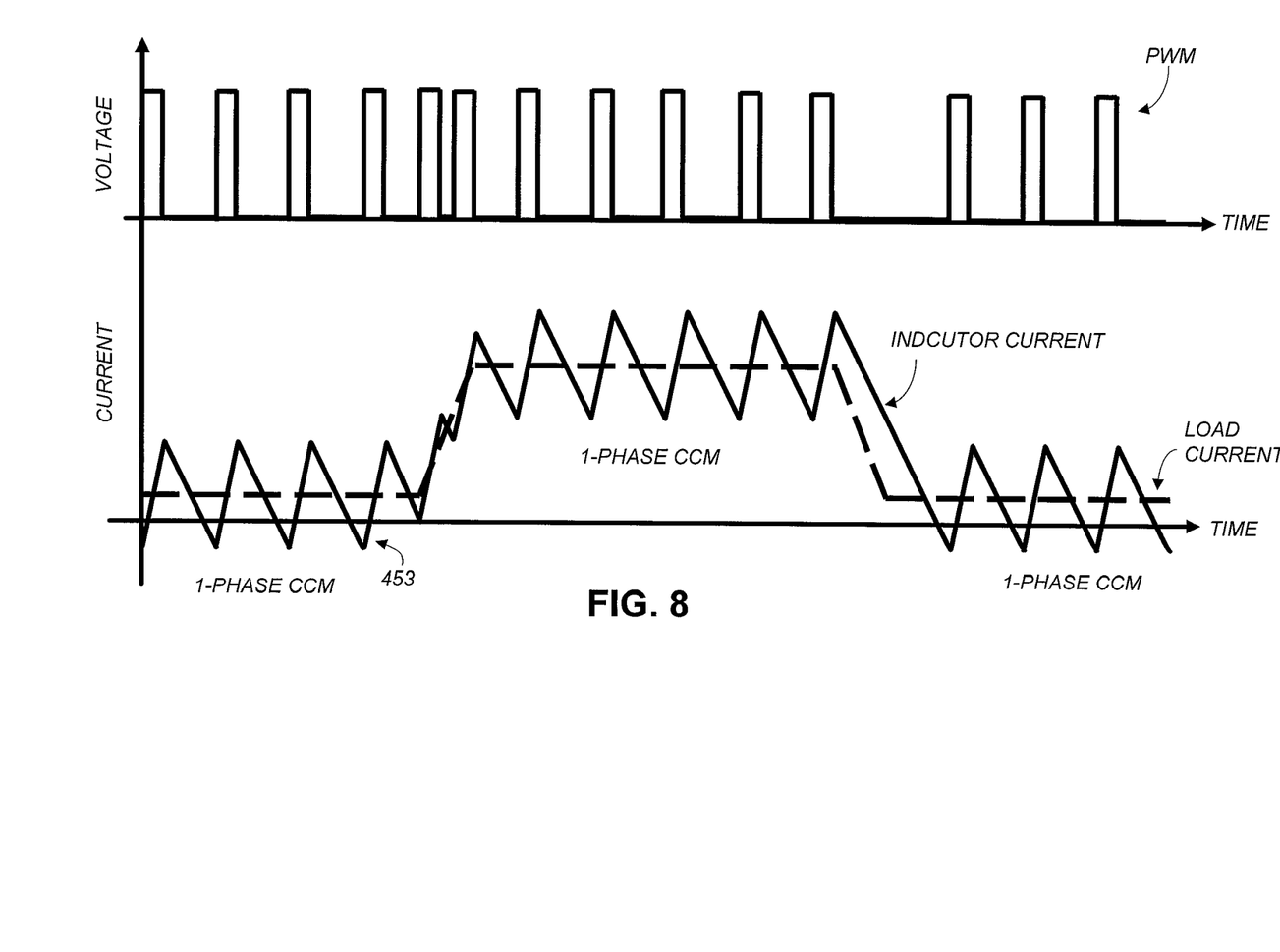
FIG. 8 shows a timing diagram of a PWM signal with corresponding inductor current and load current for a voltage regulator operating in single-phase CCM.

FIG. 8 shows a timing diagram of a PWM signal (top) with corresponding inductor current and load current (bottom) for a voltage regulator operating in single-phase CCM. In the example of FIG. 8, the power supply controller 103 generates the PWM signal so that the voltage regulator is operating in single-phase CCM in accordance with a power state command from the processor 101. As illustrated in FIG. 8, the inductor current increases when the PWM signal is ON and decreases when the PWM signal is OFF. When operating the voltage regulator in CCM, the power supply controller 103 generates the PWM signal so that the high-side and low-side switches (see FIG. 2, transistors M1 and M2) of the voltage regulator are synchronously switched. That is, the PWM signal is either ON or OFF to maintain continuous conduction of the inductor current, in accordance with CCM. This is evident from the waveform of the inductor current in FIG. 8. The inductor current can become negative when the voltage regulator is operating in CCM at low load currents (see arrow 453), resulting in power loss.

Figure 9:
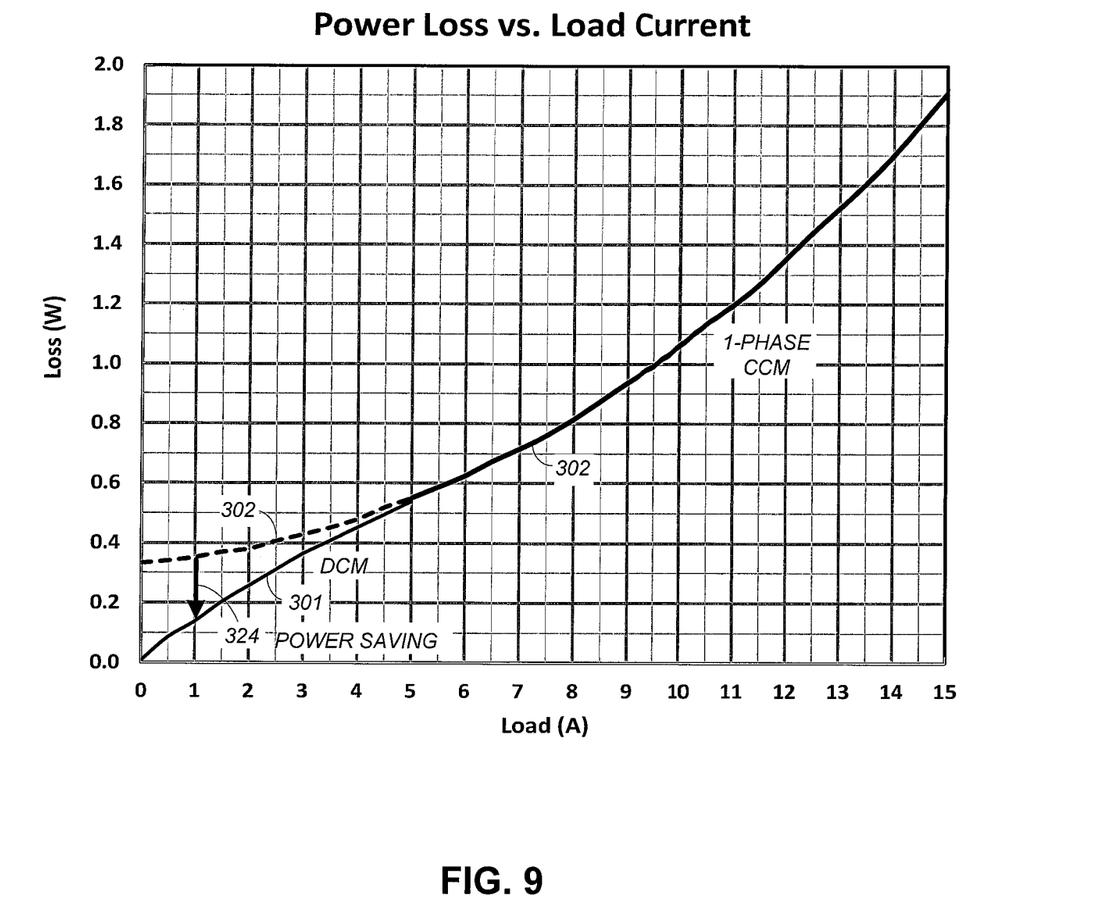
FIG. 9 show curves of voltage regulator power loss versus load current for a voltage regulator operating in DCM instead of CCM at low load currents in accordance with an embodiment of the present invention.

FIG. 9 shows curves of voltage regulator power loss versus load current for a voltage regulator that operates in DCM instead of CCM at low load currents in accordance with an embodiment of the present invention. In the example of FIG. 9, the vertical axis indicates power loss in Watt and the horizontal axis indicates load current in Amp. The curve 301 is for a voltage regulator operating in single-phase DCM and the curve 302 is for the voltage regulator operating in single-phase CCM.

In one embodiment, the voltage regulator 102-3 transitions from single-phase CCM to single-phase DCM independent of the power state indicators for the voltage regulator 102-3. More particularly, the power supply controller 103 generates the PWM signal PWM3 such that the voltage regulator 102-3 is able to operate in single-phase DCM at low load currents, even when the power state bits PSI0 and PSI1 from the processor 101 indicate operating the voltage regulator 102-3 in CCM. This results in power saving (see arrow 324) relative to operating the voltage regulator 102-3 in single phase-CCM as may be dictated by the processor 101.

Figure 10:
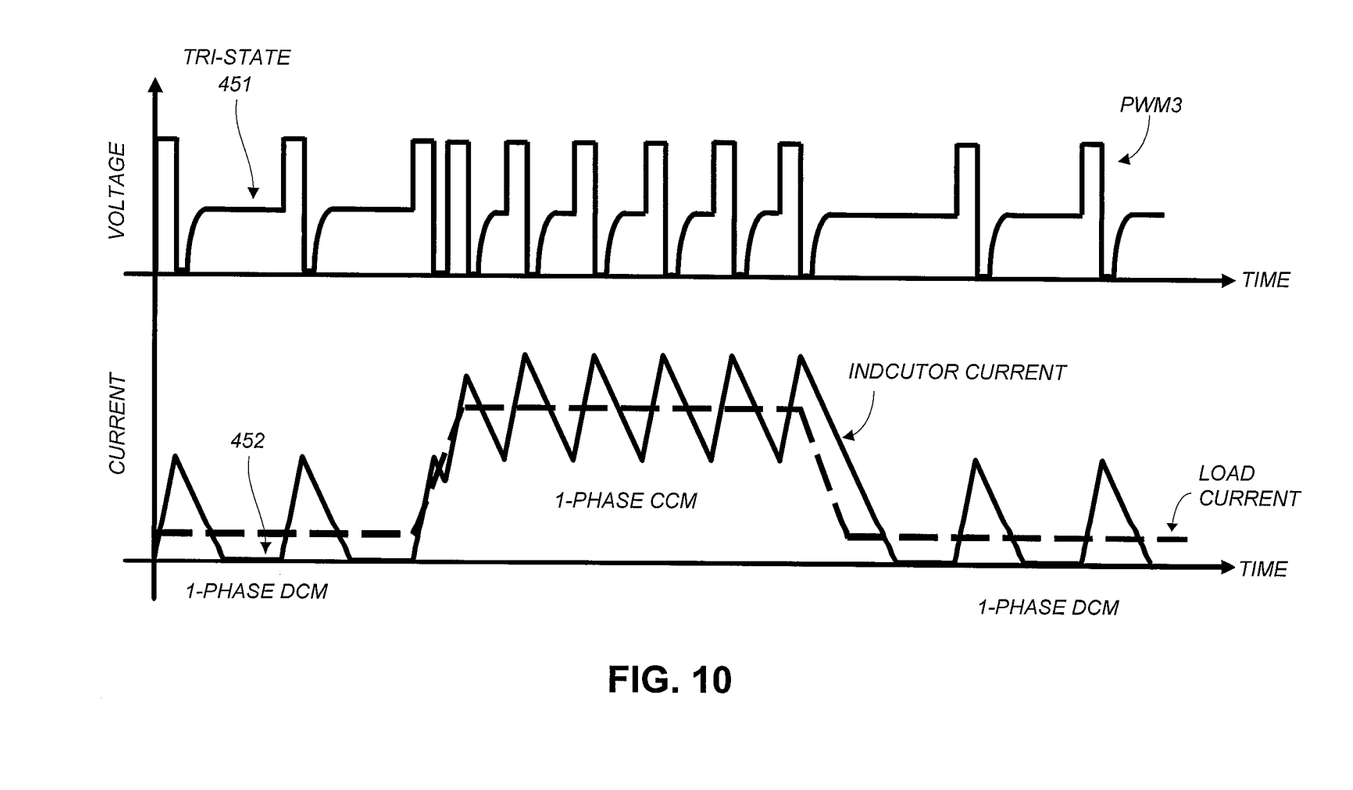
FIG. 10 shows a timing diagram of a PWM signal with corresponding inductor current and load current in accordance with an embodiment of the present invention.

FIG. 10 shows a timing diagram of the PWM signal PWM3 (top) with corresponding inductor current and load current (bottom) in accordance with an embodiment of the present invention. In the example of FIG. 10, the power supply controller 103 enables the voltage regulator 102-3 to operate in DCM independent of a power state command from the processor 101.

In the example of FIG. 10, the power supply controller 103 places the PWM signal PWM3 at a tri-state condition between pulses, and adjusts the switching frequency of the PWM signal PWM3 as needed to maintain the voltage rail RAIL2 at the voltage level commanded by the processor 101. The inductor current increases when the PWM signal PWM3 is ON and decreases when the PWM signal PWM3 is OFF. At low load currents, the switching frequency of the PWM signal PWM3 decreases to a point where the PWM signal PWM3 is at tri-state for a long enough period to allow the inductor current to decrease to zero. When the PWM signal PWM3 is at tri-state (see arrow 451), the voltage regulator 102-3 turns OFF the low-side transistor M2 (shown in FIG. 2) at zero inductor current to prevent the inductor current from going negative (see arrow 452). There is no inductor current because both the high-side transistor M1 and the low-side transistor M2 are OFF at this point, resulting in single-phase DCM operation. When the load current increases, the frequency of the PWM signal PWM3 also increases to maintain the voltage rail RAIL2 at the commanded voltage level. The increased frequency of the PWM signal PWM3 increases the inductor current so that it does not go below zero, resulting in the voltage regulator 102-3 operating in single-phase CCM. The voltage regulator 102-3 is thus able to automatically transition between CCM and DCM operation without having to follow power state commands from the processor 101.

Figure 11:
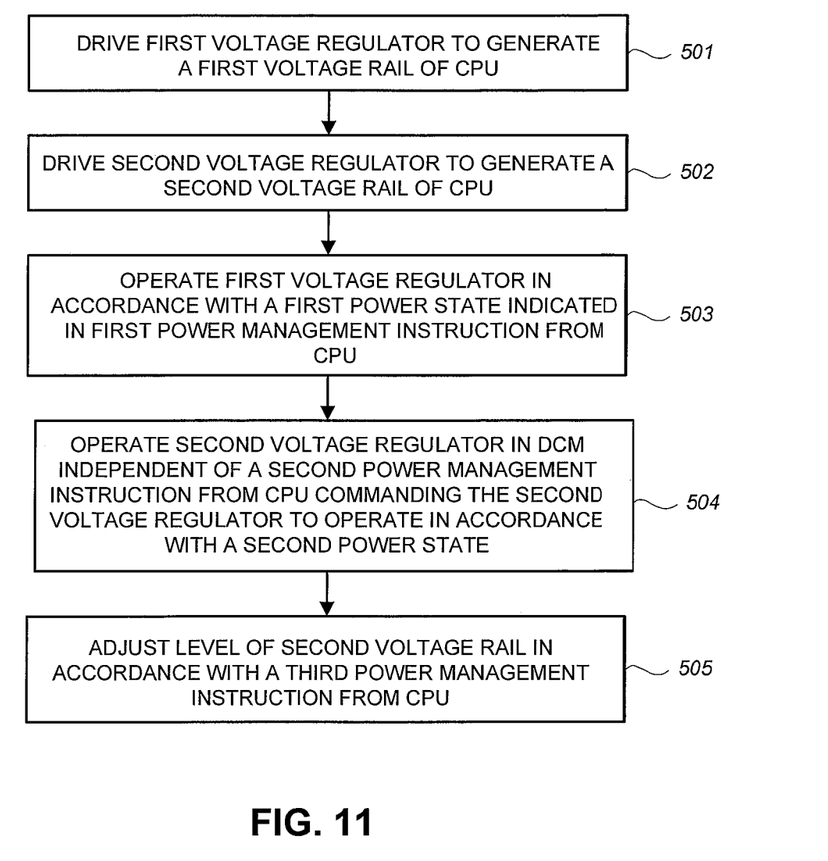
FIG. 11 shows a flow diagram of a method of providing voltage rails to a central processing unit (CPU) in accordance with an embodiment of the present invention.

FIG. 11 shows a flow diagram of a method of providing voltage rails to a CPU in accordance with an embodiment of the present invention. The method of FIG. 11 may be performed by the components shown in FIG. 1. As can be appreciated, other components may also be employed without detracting from the merits of the present invention.

In a step 501, a first voltage regulator is driven with a first control signal (e.g., PWM signal) to generate a first voltage rail of a CPU.

In a step 502, a second voltage regulator is driven with a second control signal to generate a second voltage rail of the CPU.

In a step 503, the first voltage regulator is operated in accordance with a first power state indicated in a first power management instruction received from the CPU. Power management instructions may be received from the CPU over a serial data bus. The first power state may indicate operating the first voltage regulator in CCM or other conduction mode.

In a step 504, the second voltage regulator is operated in DCM without regard to a second power management instruction received from the CPU for the second voltage regulator commanding the second voltage regulator to be operated in accordance with a second power state. For example, the second power state may indicate operating the second voltage regulator in CCM instead of in DCM. The second power state commanded by the CPU is ignored to enable the second voltage regulator to operate in DCM, such as during low load currents.

In one embodiment, the second voltage regulator otherwise follows other power management instructions received from the CPU. For example, in a step 505, the voltage level of the second voltage rail generated by the second voltage regulator is adjusted in accordance with a third power management instruction from the CPU.

Systems and methods for providing voltage rails to a processor have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system comprising:
a central processing unit (CPU) that is powered by a first voltage rail and a second voltage rail;
a first voltage regulator that is configured to generate the first voltage rail in accordance with a first pulse width modulation (PWM) signal;
a second voltage regulator that is configured to generate the second voltage rail in accordance with a second PWM signal; and
a power supply controller that is configured to generate the first PWM signal, to generate the second PWM signal, to receive a plurality of power management instructions from the CPU over a data bus, to set a voltage level of the second voltage rail in accordance with a first power management instruction from the CPU, and to enable the second voltage regulator to operate in discontinuous conduction mode (DCM) independent of a second power management instruction from the CPU to operate the second voltage regulator in accordance with a first power state.

2. The system of claim 1, wherein the first power state indicates operating the second voltage regulator in continuous conduction mode (CCM).

3. The system of claim 1, further comprising:
a third voltage regulator that is configured to generate the first voltage rail in accordance with a third PWM signal, wherein first voltage regulator and the third voltage regulator form a multiphase voltage regulator.

4. The system of claim 3, wherein the power supply controller is further configured to operate the multiphase voltage regulator in full-phase CCM in accordance with a second power state indicated in a third power management instruction from the CPU.

5. The system of claim 4, wherein the power supply controller is further configured to set a voltage level of the first voltage rail in accordance with a fourth power management instruction from the CPU.

6. The system of claim 1, wherein an output current rating of the first voltage rail is higher than an output current rating of the second voltage rail.

7. The system of claim 1, wherein the data bus is a serial data bus.

8. The system of claim 1, wherein the power supply controller is configured to place the second PWM signal in tri-state between pulses of the second PWM signal.

9. The system of claim 8, wherein the second voltage regulator comprises:
a high-side transistor;
a low-side transistor; and
an output inductor that is coupled to a switch node of the high-side and low-side transistors,
wherein the low-side transistor is turned OFF when an inductor current of the output inductor goes to zero and the second PWM signal is at tri-state.

10. A method comprising:
driving a first voltage regulator with a first pulse width modulation (PWM) signal to generate a first voltage rail that powers a central processing unit (CPU);
driving a second voltage regulator with a second PWM signal to generate a second voltage rail that powers the CPU;
operating the first voltage regulator to generate the first voltage rail in accordance with a first power state indicated in a first power management instruction from the CPU; and
operating the second voltage regulator to generate the second voltage rail in discontinuous conduction mode (DCM) without regard to a second power management instruction from the CPU that commands the second voltage regulator to operate in accordance with a second power state.

11. The method of claim 10, further comprising:
adjusting a voltage level of the second voltage rail in accordance with a third power management instruction from the CPU.

12. The method of claim 10, wherein operating the second voltage regulator to generate the second voltage rail in DCM comprises:
inserting a tri-state between pulses of the second PWM signal.

13. The method of claim 12, further comprising:
during the tri-state between pulses of the second PWM signal, turning OFF a low-side transistor of the second voltage regulator when an inductor current of an output inductor of the second voltage regulator goes to zero.

14. The method of claim 10, further comprising:
driving a third voltage regulator with a third PWM signal to generate the first voltage rail that powers the CPU, wherein the first voltage regulator generates a first phase of the first voltage rail and the second voltage regulator generates a second phase of the first voltage rail.

15. The method of claim 14, wherein the first power state indicates full-phase continuous conduction mode (CCM).

16. The method of claim 10, wherein the second power state indicates single-phase CCM.

17. A power supply controller comprising:
a data bus interface that is configured to receive a plurality of power management instructions from a central processing unit (CPU); and
a control signal generator that is configured to generate a first control signal for driving a first voltage regulator to generate a first voltage rail that powers the CPU, to generate a second control signal for driving a second voltage regulator to generate a second voltage rail that powers the CPU, to adjust a voltage level of the second voltage rail in accordance with a first power management instruction from the CPU, and to enable the second voltage regulator to operate in discontinuous conduction mode (DCM) independent of a power state command from the CPU.

18. The power supply controller of claim 17, wherein the second control signal is a pulse width modulation (PWM) signal and the control signal generator places the PWM signal in tri-state in between pulses of the PWM signal.

19. The power supply controller of claim 17, wherein the power state command indicates operating the second voltage regulator in continuous conduction mode (CCM).

20. The power supply controller of claim 17, wherein the control signal generator is configured to generate a third control signal for driving a third voltage regulator to generate the first voltage rail.

* * * * *